US012691462B2

(12) United States Patent
Christensen

(10) Patent No.: US 12,691,462 B2
(45) Date of Patent: Jul. 28, 2026

(54) APPARATUS FOR SURFACE TREATMENT, PAINTING OF CAR RIMS, AND METHOD THEREFORE

(71) Applicant: WE LINK YOU APS, Støvring (DK)

(72) Inventor: Henrik Bro Christensen, Støvring (DK)

(73) Assignee: WE LINK YOU APS, Støvring (DK)

( * ) Notice: Subject to any disclaimer, the term of this patent is extended or adjusted under 35 U.S.C. 154(b) by 0 days.

(21) Appl. No.: 18/691,162

(22) PCT Filed: Sep. 16, 2022

(86) PCT No.: PCT/DK2022/050192
§ 371 (c)(1),
(2) Date: Mar. 12, 2024

(87) PCT Pub. No.: WO2023/041135
PCT Pub. Date: Mar. 23, 2023

(65) Prior Publication Data
US 2025/0135482 A1 May 1, 2025

(30) Foreign Application Priority Data

Sep. 16, 2021 (DK) ............................ PA 2021 70457
Mar. 28, 2022 (DK) ............................ PA 2022 70142
Mar. 28, 2022 (DK) ............................ PA 2022 70143

(51) Int. Cl.
B05B 13/04 (2006.01)
B05B 16/20 (2018.01)
(Continued)

(52) U.S. Cl.
CPC .......... B05B 13/0431 (2013.01); B05B 16/20 (2018.02); B25B 5/14 (2013.01);
(Continued)

(58) Field of Classification Search
USPC ..... 118/326, 313, 315, 52, 319, 320, 58, 66, 118/323, 642–643
See application file for complete search history.

(56) References Cited

U.S. PATENT DOCUMENTS 4,611,695 A * 9/1986 Kato ................... B05B 13/0442
901/43
4,950,505 A * 8/1990 Fogal ...................... B60B 21/00
134/123
(Continued)

FOREIGN PATENT DOCUMENTS

CN 207951815 U 10/2018
CN 108906361 A 11/2018
(Continued)

OTHER PUBLICATIONS

English Translation CN-111974575-A (Year: 2020).*
(Continued)

*Primary Examiner* — Yewebdar T Tadesse
(74) *Attorney, Agent, or Firm* — Schmeiser Olsen PLLC

(57) ABSTRACT

An apparatus as well as a method for painting of a rim or another rotational symmetric item is provided. The apparatus includes: a coating unit with a robot arm and one or more spray nozzles for applying a curable fluid, an item holder equipped with assembly bodies for disengageable securing of the item with the purpose of rotating it, coinciding with the item's center axis, during the coating with the curable fluid, a suspension bracket wherein the item holder is assembled, and which rotates the item holder around a pivot point, which runs perpendicularly on the axis of rotation, coinciding with a diameter through the item and to angle the item holder, as the item is being rotated, a curing unit, and a controller configured to positioning the coating unit in
(Continued)

relation to the item for applying the fluid onto the item in accordance with a predetermined coating pattern.

18 Claims, 9 Drawing Sheets

(51) Int. Cl.
  B25B 5/14 (2006.01)
  B60B 30/06 (2006.01)

(52) U.S. Cl.
  CPC ........ B60B 30/06 (2013.01); B60B 2310/614 (2013.01); B60B 2320/00 (2013.01); B60B 2900/112 (2013.01); B60B 2900/572 (2013.01)

(56) References Cited

U.S. PATENT DOCUMENTS

| | | | |
|---|---|---|---|
| 8,453,308 B2 | 6/2013 | Helmers | |
| 2006/0108450 A1 | 5/2006 | Klinkenberg et al. | |
| 2011/0135833 A1* | 6/2011 | Schmitz | B01J 37/0215 |
| | | | 118/503 |
| 2014/0063096 A1* | 3/2014 | Pitz | B41J 11/002 |
| | | | 347/9 |
| 2017/0182516 A1 | 6/2017 | Fritz et al. | |
| 2020/0188942 A1 | 6/2020 | Song | |
| 2020/0324404 A1 | 10/2020 | Yoshino et al. | |
| 2023/0182160 A1* | 6/2023 | Steiger | B05B 16/40 |
| | | | 118/630 |

FOREIGN PATENT DOCUMENTS

| | | | | |
|---|---|---|---|---|
| CN | 208786769 U | | 4/2019 | |
| CN | 111974575 A | * | 11/2020 | B25B 5/14 |
| CN | 112354760 A | | 2/2021 | |
| CN | 213287371 U | | 5/2021 | |
| CN | 113304920 A | | 8/2021 | |
| DE | 102008009704 A1 | * | 8/2009 | B08B 7/0042 |
| EP | 1 816 229 A1 | | 8/2007 | |
| WO | 2016/207489 A1 | | 12/2016 | |
| WO | 2020/213383 A1 | | 10/2020 | |

OTHER PUBLICATIONS

DE102008009704A1 (Year: 2009).*
International Search Report for PCT/DK2022/050192 mailed on Jan. 3, 2023.
Written Opinion for PCT/DK2022/050192 mailed on Jan. 3, 2023.
Mark Boyle: "What Paint Curing Is and the Techniques You Can Use : InfraTech Infrared", Feb. 18, 2021 (Feb. 18, 2021); XP093009188, Retrieved from the Internet: URL:https://infratech-solutions.co.uk/what-paint-curing-is-and-the-techniques-you-can-use/ [retrieved on Dec. 19, 2022] the whole document.

* cited by examiner

64

80

70

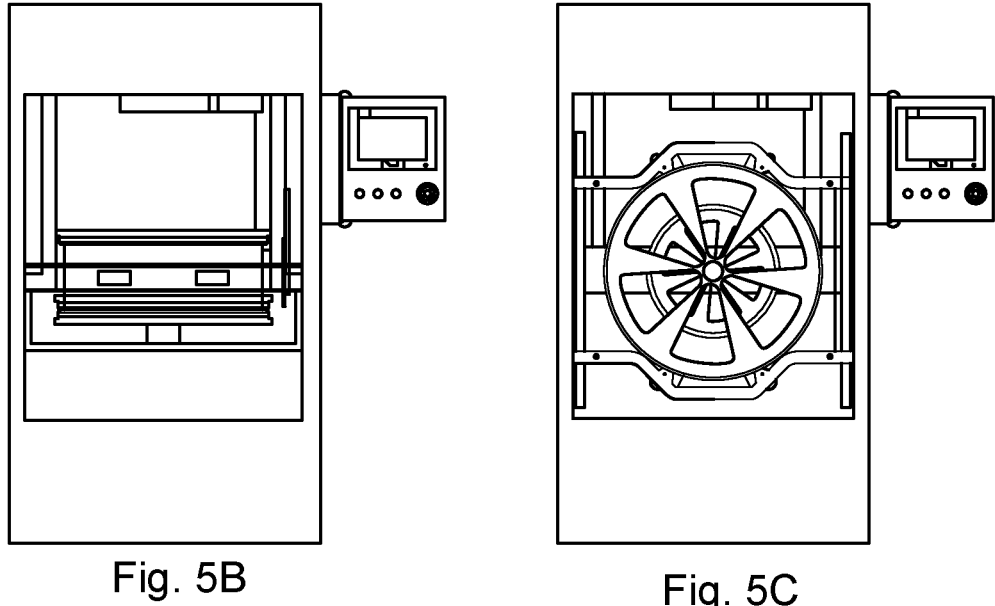
Fig. 5B          Fig. 5C
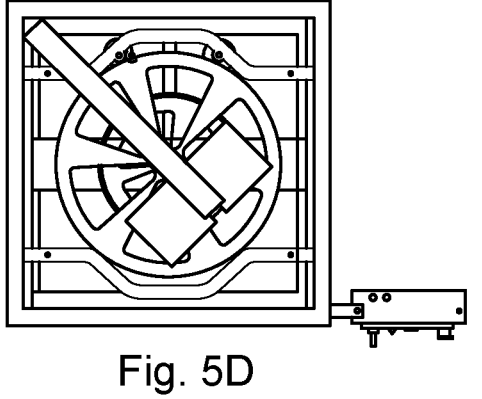
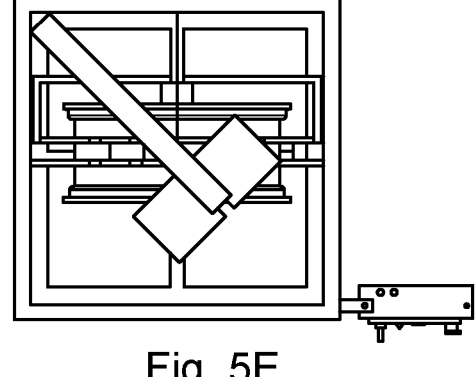
Fig. 5D          Fig. 5E

APPARATUS FOR SURFACE TREATMENT, PAINTING OF CAR RIMS, AND METHOD THEREFORE

CROSS-REFERENCE TO RELATED APPLICATIONS

This application claims priority to PCT Application No. PCT/DK2022/050192, having a filing date of Sep. 16, 2022, which is based DK Application No. PA 2022 70142, having a filing date of Mar. 28, 2022, and DK Application No. PA 2022 70143, having a filing date of Mar. 28, 2022 and DK Application No. PA 2021 70457 having a filing date of Sep. 16, 2021, the entire contents all of which are hereby incorporated by reference.

FIELD OF TECHNOLOGY

The following relates to an apparatus and a procedure for the painting of rotationally symmetric units, mainly car rims.

BACKGROUND

Embodiments of the invention have been developed with car rims in mind but can be used for processing other types of rotationally symmetric items.

Until now renovating car rims has proven troublesome, especially in relation to painting these. As car rims occupy a paint booth, it thus becomes difficult to have car rims painted in a traditional paint booth for capacity reasons.

This has often caused car rims to be discarded rather than renovated. This is an obvious disadvantage, as there are typically four or eight rims associated with each car, depending on whether one has whole-year or winter- and summer tires for a car.

When renovating rims, these can optionally be prefinished. Such a pre-treatment can entail repairing distortions, for instance through turning of rims, but can likewise entail the removal of old paint, for instance through sandblasting.

Hereafter, the renovation will entail a surface treatment of the rims.

Such a surface treatment will typically entail painting the rims or alternatively lacquering the rims with clear lacquer.

To lighten the amount of work using paint booths there is a desire for an alternative solution for surface treatment of the rims rather than traditional paint jobs using paint booths.

There is thus a desire to be able to supply the rims with a surface treatment in the form of either painting or coating, regardless of whether the rims at the time of renovation have received a pre-treatment or not, of the variants mentioned above.

SUMMARY

An aspect relates to an apparatus and an approach for use in renovating car rims and other rotationally symmetric items and enable an effective and simple way of providing these with a surface treatment or surface coating.

According to embodiments of the present invention, this is achieved with an apparatus for painting of a rim or another rotational symmetric item, characterised in that it comprises:

an openable paint booth with air inlet and air outlet, and gate for closing the paint booth during operation, a coating unit with one or more spray nozzles for coating the fluid onto the item, an item holder equipped with assembly bodies for disengageable securing of the item with the purpose of rotating it around a rotational axis, coinciding with the item's center axis, during the coating with the curable fluid, a suspension bracket wherein the item holder is assembled, and which is adapted to rotate the item holder around a pivot point, which runs perpendicularly on the axis of rotation, coinciding with a diameter through the item and to angle the item holder, as the item is being rotated, a curing unit configured for hardening the curable fluid, and a controller connected to the apparatus' distinct elements to control these during operation.

Alternatively, the aspect of the invention is achieved with an apparatus for painting a rim or another rotational symmetric item, characterised in that it comprises:

an openable paint booth with air inlet and air outlet, and gate for closing the paint booth during operation, a coating unit with one or more spray nozzles for coating a curable UV fluid onto the item, an item holder equipped with assembly bodies for disengageable securing of the item with the purpose of rotating it around a rotational axis, coinciding with the item's center axis, during the coating with curable UV fluid, a suspension bracket wherein the item holder is assembled, and which is adapted to rotate the item holder around a pivot point, which runs perpendicularly on the axis of rotation, coinciding with a diameter through the item and to angle the item holder, as the item is being rotated, a lighting unit supplied with UV curing light, and a controller connected to the apparatus' distinct elements to control these during operation.

Alternatively, the aspect of the invention in accordance with the present invention is achieved with an apparatus for painting a rim or another rotational symmetric item, a car rim, characterised in that it comprises:

an openable paint booth with air inlet and air outlet, and gate for closing the paint booth during operation, a coating unit comprising a robot arm and one or more spray nozzles for coating the fluid onto the item, an item holder equipped with assembly bodies for disengageable securing of the item with the purpose of rotating it around a rotational axis, coinciding with the item's center axis, during the coating with the curable fluid, a suspension bracket wherein the item holder is assembled, and which is adapted to rotate the item holder around a pivot point, which runs perpendicularly on the axis of rotation, coinciding with a diameter through the item and to angle the item holder, as the item is being rotated, a curing unit, and a controller configured to position the coating unit in relation to the item for applying the fluid onto the rim in accordance with a pre-determined coating pattern.

Alternatively, the aspect of the invention is achieved with an apparatus for painting a rim or another rotational symmetric item, a car rim, characterised in that it comprises steps of:

assembling the item in assembly bodies on an item holder, coating with curable fluid using a coating unit comprising one or more spray nozzles, rotating the item around an axis of rotation, coinciding with the item's center axis during coating with the curable fluid, angling the item holder during rotation where the angling is performed around a pivot point which runs perpendicularly on the axis of rotation, coinciding with a diameter through the item, UV exposure of the item with a light unit, and dismounting the item from the assembly bodies.

Alternatively, the aspect of the invention is achieved with an apparatus for painting a rim or another rotational symmetric item, a car rim, characterised in that it comprises steps of:

assembling the item in assembly bodies on an item holder, coating with curable UV fluid using a coating unit comprising one or more spray nozzles, rotating the item around an axis of rotation, coinciding with the item's center axis during coating with the curable UV fluid, angling the item holder during rotation where the angling is performed around a pivot point which runs perpendicularly on the axis of rotation, coinciding with a diameter through the item, curing the fluid with a curing unit configured to cure the curable fluid, and dismounting the item from the assembly bodies.

Alternatively, the aspect of the invention is achieved with an apparatus for painting a rim or another rotational symmetric item, characterised in that it comprises steps of:

assembling the item in assembly bodies on an item holder, coating with curable fluid using a coating unit comprising a robot arm and one or more spray nozzles, rotating the item around an axis of rotation, coinciding with the item's center axis during coating with the fluid, angling the item holder where the angling is performed around a pivot point which runs perpendicularly on the axis of rotation, coinciding with a diameter through the item, curing the fluid with a curing unit, and dismounting the item from the assembly bodies.

The apparatus according to the invention is a simple construction which can easily be placed inside workshops with modest ventilation requirements and such, as it is common for paint booths.

The apparatus according to the invention is a simple construction which is provided in a single housing. The apparatus can be designed in such a way, that the openable paint booth comprises the additional elements that are comprised by the apparatus.

The technical effect which is achieved through the invention is the establishing of a renovated car rim or other rotationally symmetric item, which has undergone a surface treatment in the form of a lacquer or paint which is UV curable.

The same technical effect can be achieved with the invention being adapted with an IR curable fluid and an IR curing unit in place of the lighting unit with UV light as its curing unit.

In the following, the invention is by default being described with the use of curable UV fluid and appertaining lighting source with UV lighting as its curing unit. In a similar fashion and with similar technical effects, the invention can be worked with curable IR fluid and a suitable curing unit, which emits IR radiation, also referred to as an IR curing unit.

Likewise, the invention is by default being described for painting a rim or mounting the rim in a rim holder.

With a curable UV fluid, a faster treatment can be achieved, as the time to cure is shortened in comparison to the typical time to cure for other lacquers/paints.

Typically, a time to cure of two minutes can be applied for a car rim.

With a treatment in accordance with the method of the invention, it becomes possible to recycle rims even if these have a poor lacquer-/paintjob.

It is possible to apply a new coat of paint or alternatively carry out a lacquering which creates a coating on top of old lacquer/paint.

The apparatus comprises a rotational unit which facilitates rotation of the item during coating with curable UV fluid and UV lighting for curing the applied coating of curable UV fluid. Thus, the fluid can be applied and cured even in complex structures, which can appear on a rim.

After coating the rim, the item is exposed to UV lighting in order to achieve curing of the fluid applied to the rim.

The fluid that is being used can be a curable UV- or IR fluid, which can be provided in the form of clear lacquers or colours for a desired colouring of the item.

As part of the surface treatment with the curable UV fluid it is significant that the item is rotated and/or angled in relation to the UV light. Alternatively, that the item is rotated during the use of the second treatment unit during the UV exposure. This is especially important for complicated constructions such as car rims, which have many surfaces and holes that can be difficult to reach, if the item is not being rotated and/or angled.

Alternatively, it will also be possible to place the item in a secured position in a room where UV light sources are rotated around the item. Such a rotation can happen solely around a secured rotational axis or can happen with light sources that are being rotated around a rotational axis that, under the UV light, receives a variable angling in accordance with the item that is undergoing treatment.

According to another embodiment the apparatus is, according to the invention, characterised in that the assembly bodies comprise a cone shaped body, which is meant for engaging with a center bore in the item.

A center bore is located on all car rims. By utilizing a cone shaped body, the same unit can be used on different rims on which the diameter of the center bore can vary.

According to another embodiment the apparatus is, according to the invention, characterised in that the assembly bodies comprise at least three and four rotating wheels for supporting the rim at its circumference. Desirably by the rim's outer circumference or alternatively by another circumference, where coating in the curably UV fluid is not required.

Thus, it is achieved that the rim can be assembled in such a manner that it is being secured and rotated during coating with the curable UV fluid, so that sufficient curable UV fluid is applied onto all the rim parts intended for coating without having to dis- and remount the rim.

According to another embodiment the apparatus is, according to embodiments of the invention, characterised in the rotational wheels being assembled to allow for displacement toward each other and away from each other for adjusting to different rim sizes.

By securing or supporting the rim with wheels by the rim's circumference, combined with the ability to displace the rotational wheels, the same assembly bodies can be applied for different rims where the diameter of the rim varies.

The rotational wheels can thus be displaced toward each other and away from each other in relation to a center of the rim.

According to another embodiment the apparatus is, according to the invention, characterised in that at least one rotational wheel is connected with a motor for rotating the rim during operation of the apparatus.

According to another embodiment the apparatus is, according to the invention, characterised in that the suspension bracket and the spray nozzles are arranged mutually displaceable.

According to another embodiment the apparatus is, according to the invention, characterised in that the spray nozzles and the light unit being assembled on the same guide.

According to another embodiment the apparatus is, according to the invention, characterised in that it comprises mirrors to reflect the UV light from the light sources in different directions.

According to another embodiment the apparatus is, according to the invention, characterised in that assembly of the rim in assembly bodies on a rim holder comprises, that the assembly bodies are displaced in a direction away from each other and/or toward each other, for accommodating different rim sizes.

According to another embodiment the apparatus is, according to the invention, characterised in providing and/or utilizing the apparatus in accordance with the described embodiments.

The rim holder can, be arranged with the rotational axis in a vertical position during mounting and dismounting of the rim into or out of the rim holder.

It is likewise possible that the angle of the item is changed relative to the vertical direction during the UV exposure.

It is thus ensured that all parts on the item are struck by the UV light, even in complex constructions such as car rims.

According to an embodiment, the method is according to the invention characterised in, that the method comprises picking a fluid among curable UV paint and curable UV lacquer.

In embodiments, the method can be adjusted to accommodate the use of curable IR fluid and a curable IR curing unit suitable for emitting IR radiation for the purpose of curing; the IR curing unit can thus replace the UV light. Same technical effects for method with curable UV fluid and the light unit can be accomplished with the method wherein a curable IR fluid and IR curing unit is used.

As mentioned above the fluid can not only be a paint but also a lacquer. The lacquer can be a clear lacquer which is applied onto a painted surface or an abraded surface, so that the surface's colour is retained. If a different colour is desired, a paint is chosen.

The apparatus can for instance be constructed as illustrated in FIGS. 1-8.

Herein, among other things, a control unit for the apparatus along with a gallows support for a rim holder is illustrated, so that all steps of the method can be completed in one housing.

Alternatively, the aspect of the invention is achieved with an apparatus of the introductory described variant, comprising:

an openable paint booth with air inlet and air outlet, and gate for closing the paint booth during operation, a coating unit comprising a robot arm and one or more spray nozzles for applying a curable fluid onto the rim, a rim holder equipped with assembly bodies for disengageable securing of the rim with the purpose of rotating it around a rotational axis, coinciding with the rim's center axis, during the coating with the curable fluid, a suspension bracket wherein the rim holder is assembled, and which is adapted to rotate the rim holder around a pivot point, which runs perpendicularly on the axis of rotation, coinciding with a diameter through the rim and to angle the item holder, as the rim is being rotated, a curing unit, and a controller configured to position the coating unit relative to the rim to facilitate application of the fluid onto the rim in accordance with a predetermined coating pattern.

According to another embodiment the apparatus is, according to the invention, characterised in that the assembly bodies comprise at least three and four rotating wheels for supporting the rim at its circumference.

According to another embodiment the apparatus is, according to the invention, characterised in the rotational wheels being assembled to allow for displacement toward each other and away from each other for adjusting to different rim sizes, so that the rim's center is, coinciding with the pivot point and axis of rotation's point of intersection.

According to another embodiment the apparatus is, according to the invention, characterised in that at least one rotating wheel is connected with a motor (6) for rotating the rim when the apparatus is operating.

According to another embodiment the apparatus is, according to the invention, characterised in the application unit comprising a gripping device adapted to hold and activate one or more spray nozzles.

One of the gripping device's effects is that the apparatus can handle external spray units, such as individual spray cans or supply hoses with spray nozzles, which are not permanently assembled in the apparatus. A benefit derived from this can be lightened and reduced cleaning and maintenance requirements as the spray nozzles are assembled on the external units and are thus switched concurrently with the fluid. By default, the spray nozzles will be one of the elements that require the highest amount of cleaning and maintenance.

According to an embodiment, the method is according to the invention characterised in spray nozzles and curing unit being assembled on the same robot arm.

Alternatively, the aspect of the invention is achieved in accordance with the present invention, with a method for painting a rim or another rotationally symmetric item, comprising steps of assembly of the rim in assembly bodies on a rim holder, coating with curable fluid using a coating unit comprising a robot arm and one or more spray nozzles, rotating the item around an axis of rotation, coinciding with the item's center axis during coating with the fluid, angling the item holder where the angling is performed around a pivot point which runs perpendicularly on the axis of rotation, coinciding with a diameter through the rim, curing the fluid with a curing unit, and dismounting the item from the assembly bodies.

According to an embodiment the aspect of the invention is achieved with a method for control of robot arm and rim holder for coating with the curable fluid, for painting of a rim or other rotational symmetric item, where the method comprises steps to receive input concerning the rim's size and number of spokes in the rim, calculate a coating pattern for applying the fluid based on the number of spokes and rim size, calculate mutual movement pattern for the rim and the coating unit to achieve the calculated coating pattern, and move the rim and the coating unit based on the calculated movement patterns.

According to an embodiment, the method is according to the invention characterised in that the assembly of the rim in the assembly bodies comprises that the assembly bodies are displaced in a direction away from each other and/or toward each other, for accommodating different rim sizes.

According to an embodiment the apparatus is according to the invention characterised in that it comprises providing the apparatus in an embodiment which comprises the robot arm.

According to an embodiment the apparatus is according to the invention characterised in that it comprises picking a fluid among curable UV fluid and curable IR fluid.

For example, the apparatus with the robot arm can be designed as it is illustrated in FIGS. 7-8.

Herein, among other things, a control unit for the apparatus along with a gallows support for a rim holder is illustrated, so that all steps of the method can be completed in one housing.

An application can be as follows:

Step 1

The rim is assembled onto the assembly bodies.

Step 2

The door to the paint booth is closed and a potential security system is activated.

Step 3

Ventilation starts.

Step 4

Rim holder and coating unit is moved to a starting position.

Step 5

The coating unit is moved along a first spoke so that the fluid is applied on the first spoke. Then, the rim holder rotates the rim until the coating unit is position opposite of the next spoke, whereafter the process is repeated until all spokes are lacquered.

Afterwards the rim holder rotates and potentially angles the rim for lacquering of the rim's outer edge.

Step 6

The curing unit is activated, and the curing process begins. The time taken can vary based on the coating thickness of the applied fluid and the type of fluid.

Step 7

Rim holder angles and rotates the rim to the starting position for the other side of the rim, whereafter the process in accordance with steps 4, 5, and 6 is repeated, so that the rim is painted, and the fluid is thoroughly cured on both sides. Ventilation stops and the door can be opened.

Step 8

The rim can be dismounted from the rim holder by the assembly organs being displaced away from the rim.

BRIEF DESCRIPTION

Some of the embodiments will be described in detail, with references to the following Figures, wherein like designations denote like members, wherein:

FIG. 5B depicts further embodiments of the apparatus showing a controller connected to the apparatus' different elements to control these during operation;

FIG. 5C depicts further embodiments of the apparatus showing a controller connected to the apparatus' different elements to control these during operation;

FIG. 5D depicts further embodiments of the apparatus showing a controller connected to the apparatus' different elements to control these during operation;

FIG. 5E depicts further embodiments of the apparatus showing a controller connected to the apparatus' different elements to control these during operation;

DETAILED DESCRIPTION

In FIGS. 1-6 schematic illustration of an embodiment of the apparatus 1 with a coating unit 3' with spray nozzles and a rim holder 60, where the various figures illustrate different operating states for execution of the method, are illustrated.

Figure 1A:
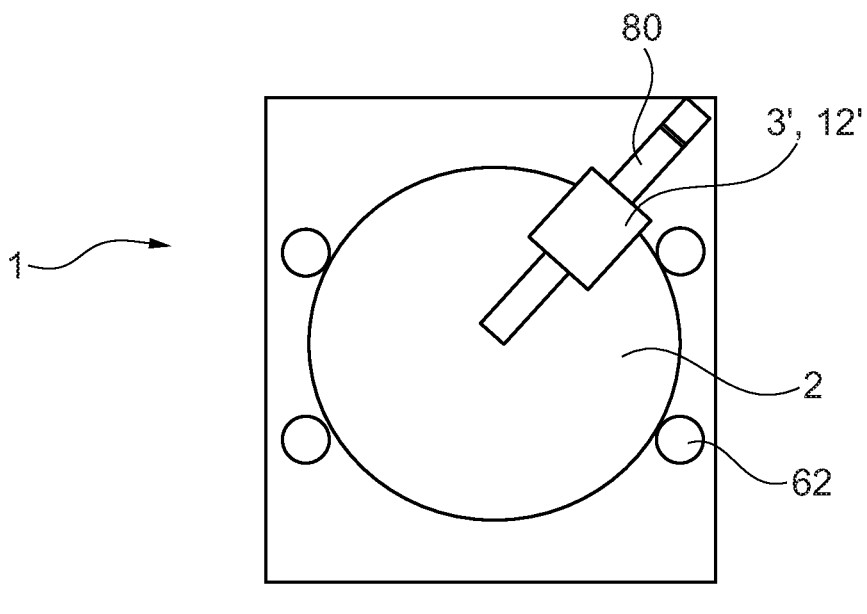
FIG. 1A depicts partial sectional views through an embodiment of an apparatus in various operating states for execution of the method.
Figure 1B:
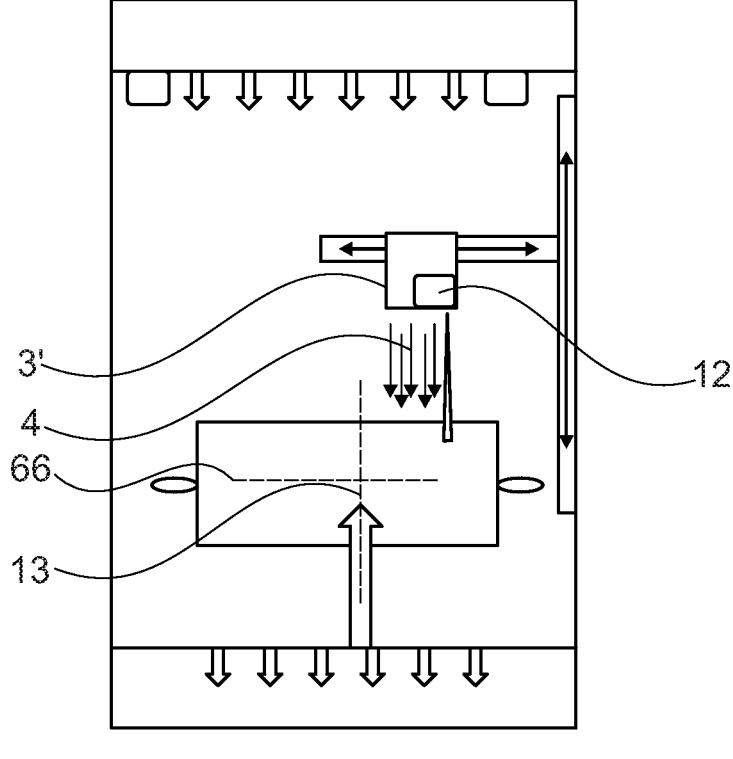
FIG. 1B depicts partial sectional views through an embodiment of an apparatus in various operating states for execution of the method.
Figure 1C:
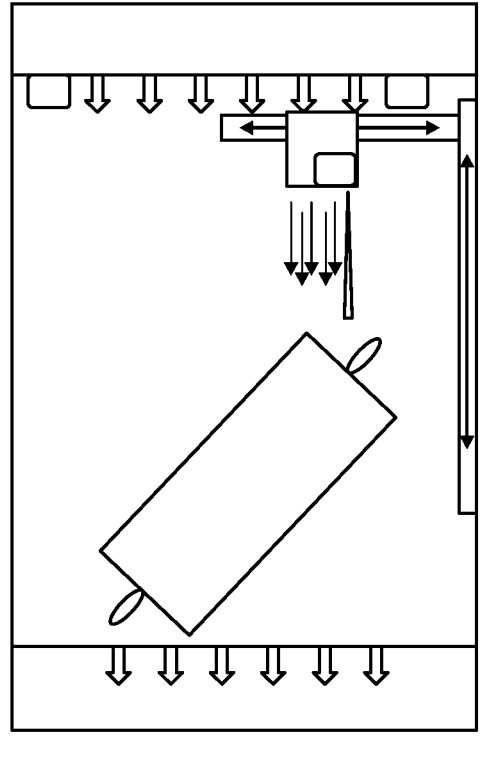
FIG. 1C depicts partial sectional views through an embodiment of an apparatus in various operating states for execution of the method.
Figure 1D:
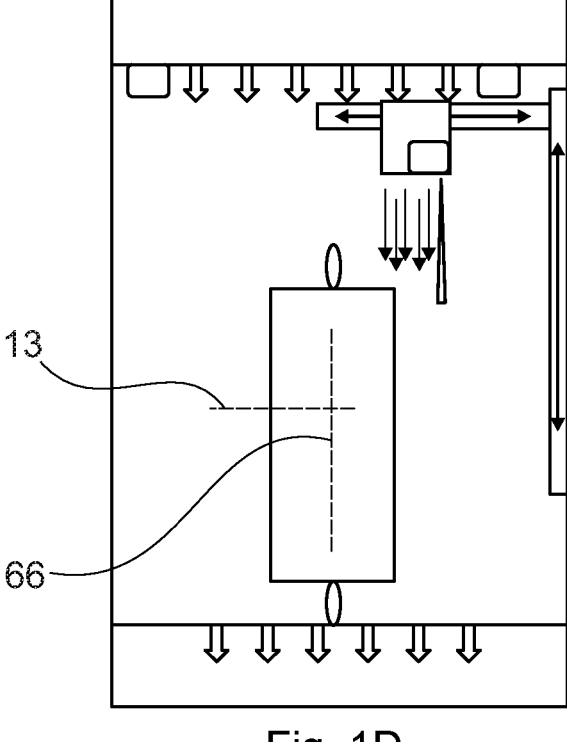
FIG. 1D depicts partial sectional views through an embodiment of an apparatus in various operating states for execution of the method.

FIGS. 1A-1D illustrates a schematic illustration of the apparatus 1 shown from a top- and side view respectively. The apparatus comprises a paint booth with air inlet and air outlet, as illustrated in FIGS. 1B-1D with the arrows in the top and bottom of the paint booth. The paint booth can comprise a door (not shown) for closing off the paint booth during operation.

The apparatus comprises a coating unit 3' with spray nozzles for application of a curable UV fluid 4 onto the rim. The coating unit is assembled to allow for displacement in a guide 80.

Likewise, the apparatus in the illustrated embodiment comprises a rim holder 60 supplied with assembly bodies 62 to secure the rim and to rotate it around an axis of rotation 13. The axis of rotation is coinciding with the rim's center axis during the application of the curable UV fluid. The rim is secured to allow for disengagement, so that the rim can easily be mounted and dismounted.

The rim holder is assembled in a suspension bracket 64. The suspension bracket is adapted to rotate the rim holder around a pivot point 66. The pivot point runs perpendicular on the axis of rotation and is coinciding with a plane for the diameter through the rim. One purpose behind the suspension bracket is to allow for angling the rim holder as it is being rotated simultaneously. This angling of the rim during operation is illustrated in FIGS. 1B-D.

The apparatus likewise comprises a light unit 12' supplied with UV curing light for curing the curably UV fluid after application onto the rim.

A controller 70, see FIG. 5A-E, is connected to the apparatus' different elements to control these during operation, to thereby ensure coating with UV fluid on all the desired surfaces on the rim, by ensuring rotation and angling of the rim in accordance with the coating unit's placement and activation. This also pertains to the light unit which must be activated based on whether the UV fluid is applied, and that it is sufficiently cured in all the coated areas.

FIGS. 2-6 illustrate further embodiments of the apparatus, where examples on the paint booth's possible design appear in more explicit detail.

Figure 2:
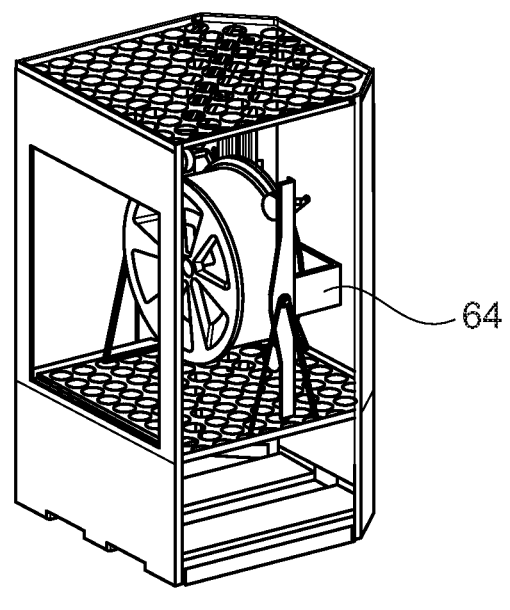
FIG. 2 illustrates further embodiments of the apparatus, where examples on the paint booth's possible design appear in more explicit detail.
Figure 3:
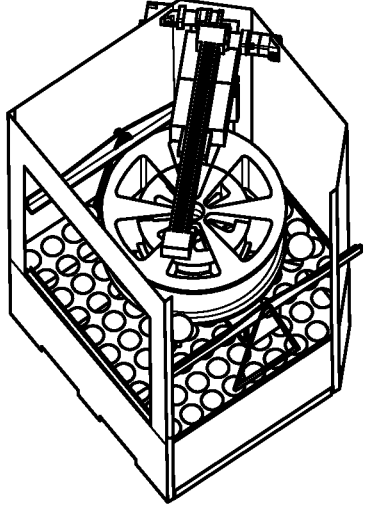
FIG. 3 illustrates further embodiments of the apparatus, where examples on the paint booth's possible design appear in more explicit detail.

FIGS. 2 and 3 illustrate the apparatus with the rim assembled in the rim holder and suspended in the suspension bracket with the rim angled in a vertical and horizontal orientation respectively.

The illustrated embodiments display the use of assembly bodies 62 in the form of rotating wheels for support and rotation respectively, of the rim at its circumference. The rotating wheels are illustrated as being placed on the rim's outer circumference and to work an area, where rim, during use, will be covered by a tyre. Thus, the wheels work an area where coating with paint or lacquer is not required while the wheel is in use.

Figure 4:
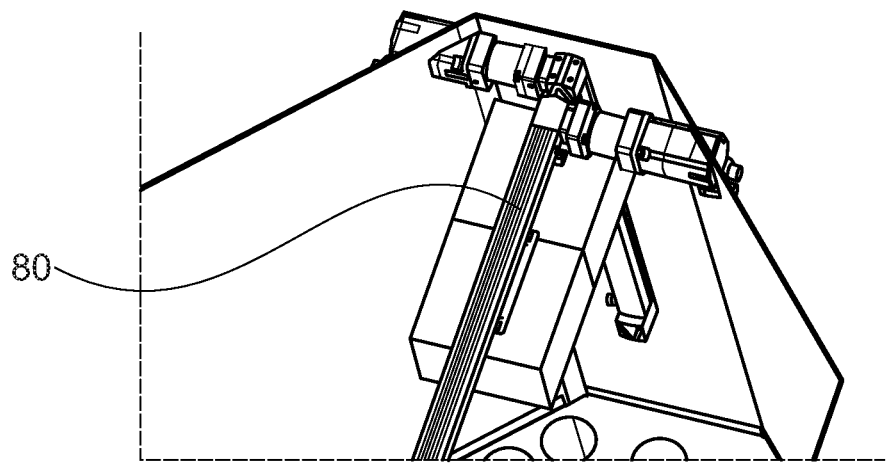
FIG. 4 illustrates further embodiments of the apparatus, where examples on the paint booth's possible design appear in more explicit detail.
Figure 5A:
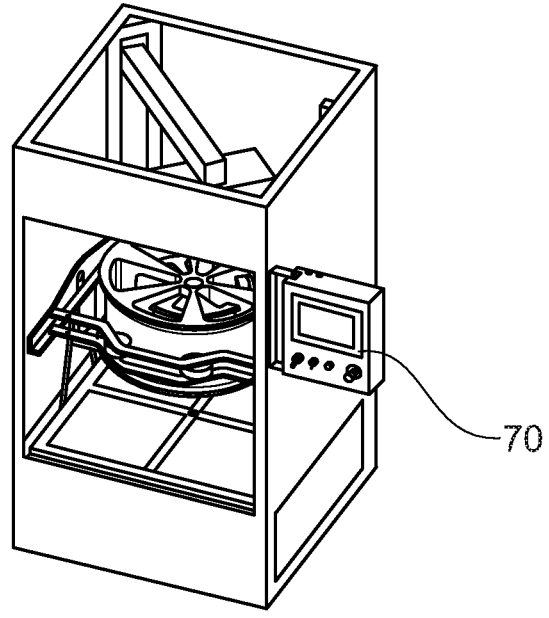
FIG. 5A depicts further embodiments of the apparatus showing a controller connected to the apparatus' different elements to control these during operation.

Particularly in FIG. 4, a possible guide for the coating- and light units 3',12' is illustrated, where the units can be displaced in a vertical and horizontal direction respectively, upon guides arranged in equivalent directions.

Figure 6A:
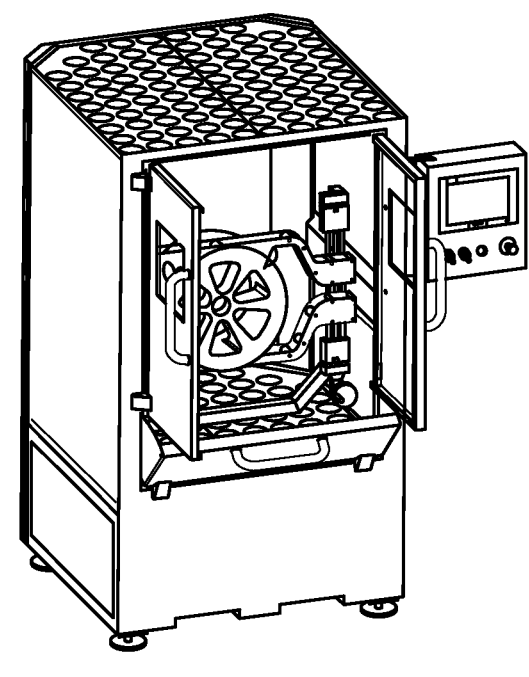
FIG. 6A illustrates a further embodiment wherein the rim holder comprises two displaceable arms around a center point where each arm comprises two assembly bodies in the form of rotating wheels.
Figure 6B:
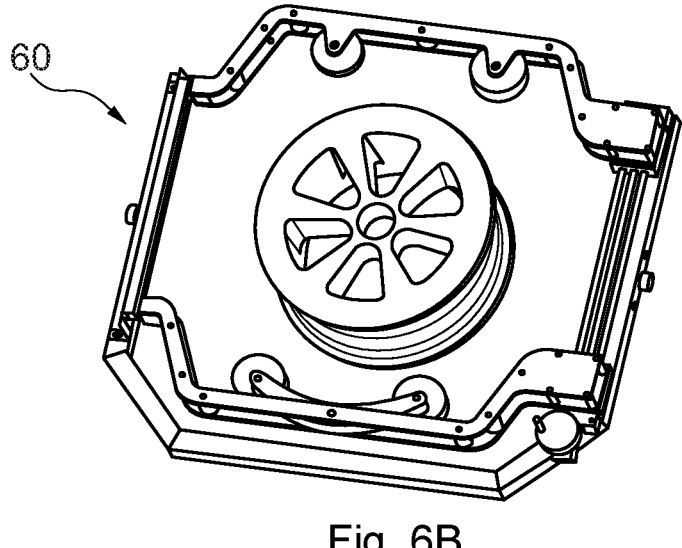
FIG. 6B illustrates a further embodiment wherein the rim holder comprises two displaceable arms around a center point where each arm comprises two assembly bodies in the form of rotating wheels.
Figure 6C:
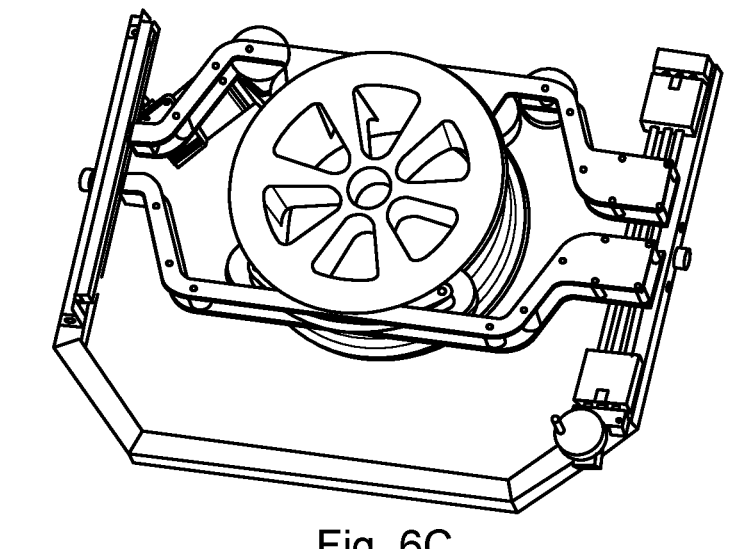
FIG. 6C illustrates a further embodiment wherein the rim holder comprises two displaceable arms around a center point where each arm comprises two assembly bodies in the form of rotating wheels.
Figure 6D:
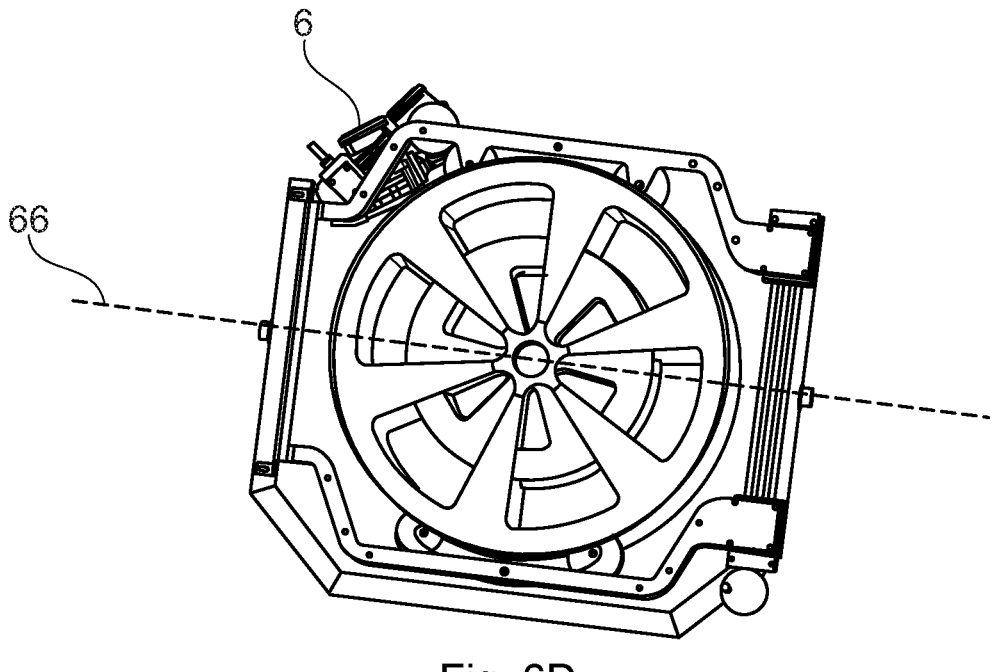
FIG. 6D illustrates a further embodiment wherein the rim holder comprises two displaceable arms around a center point where each arm comprises two assembly bodies in the form of rotating wheels.

FIGS. 5A-E and 6A-D illustrate a further embodiment wherein the rim holder comprises two displaceable arms around a center point where each arm comprises two assembly bodies 62 in the form of rotating wheels. Thus, it is accomplished that the rotating wheels can be displaced toward and away from each other, so that the rim holder can be adjusted for use with different rim sizes. As it appears in FIG. 6B, the rim holder is adapted to be suspended in a suspension bracket so that the rim can be angled. FIG. 6D shows a motor 6 to operate at least one of the rotating wheels, so that the rim can be rotated. The rim can be rotated at a specific angle corresponding with the angling between each spoke, so that the coating unit can run in a horizontal movement along a spoke for applying curable UV fluid on the specific spoke, whereafter the rim is once again rotated at the specific angle to allow for coating with UV fluid onto the next spoke. This approach continues until the rim has undergone a full 360-degree rotation. Then, the rim can be angled at 180 degrees to allow for coating with UV fluid on the other side. Alternatively, the UV fluid can be cured using the light unit prior to angling the rim 180 degrees, for coating with UV fluid on the other side.

Figure 7:
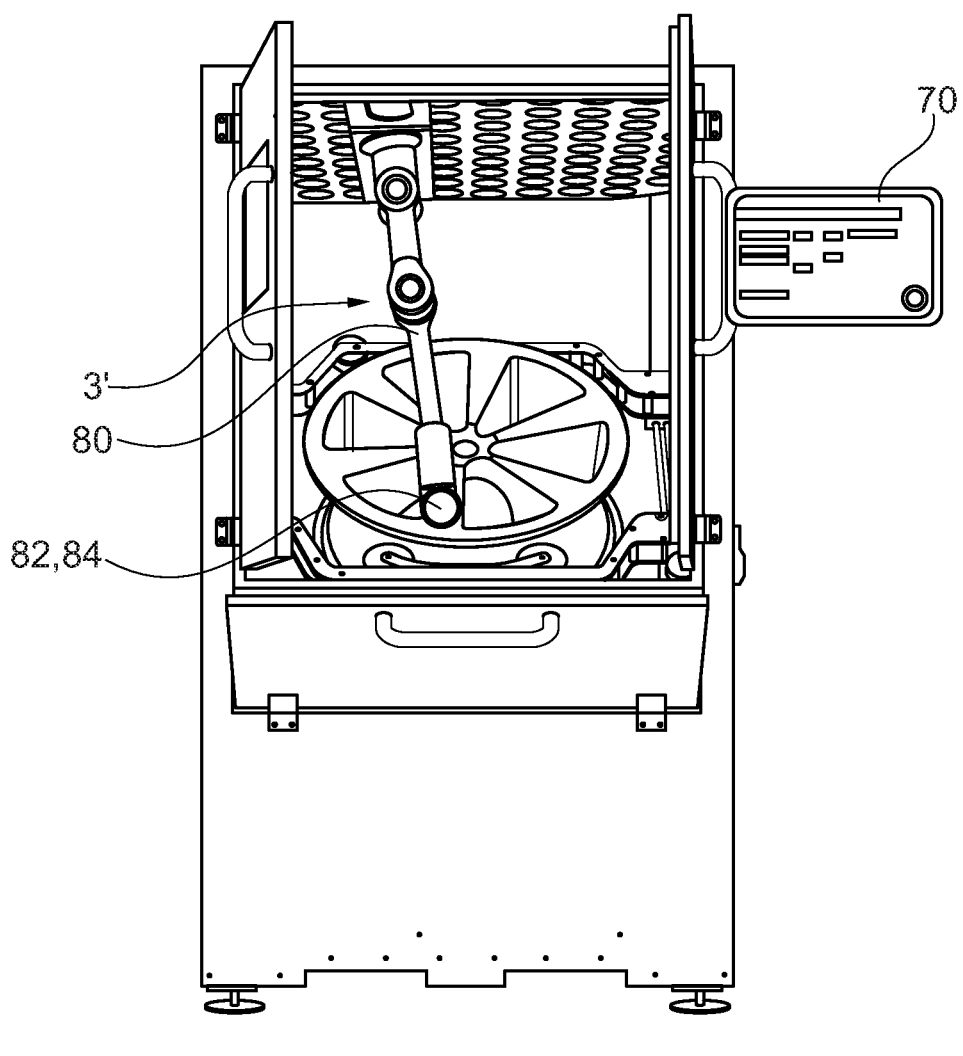
FIG. 7 depicts further embodiments of the apparatus with a coating unit comprising a robot arm.
Figure 8A:
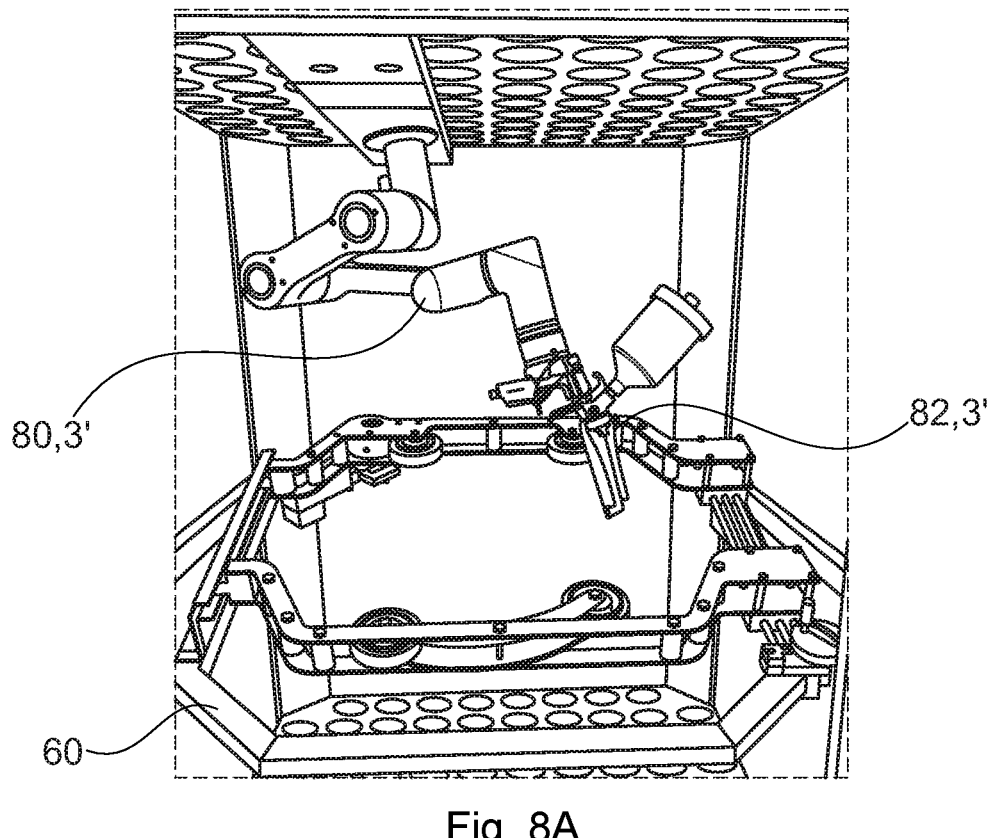
FIG. 8A depicts further embodiments of the apparatus with a coating unit comprising a robot arm.
Figure 8B:
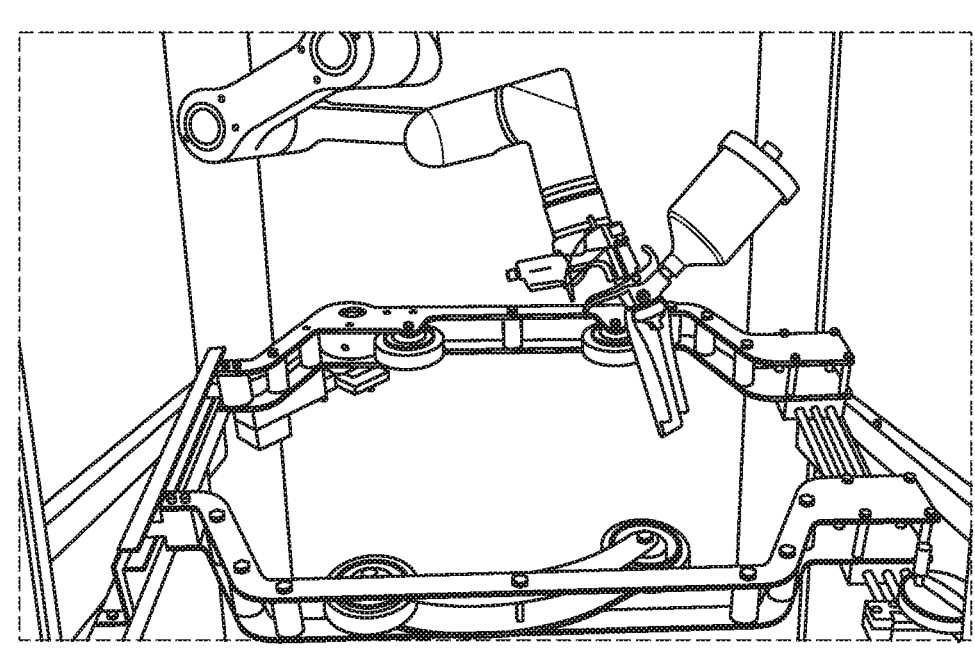
FIG. 8B depicts further embodiments of the apparatus with a coating unit comprising a robot arm.

In FIGS. 7 and 8A-B a further embodiment is illustrated, with a coating unit 3' comprising a robot arm 80 and one or more spray nozzles 82 for applying a curable fluid onto the rim. Thereby, an apparatus with a greater freedom of movement for the coating unit is achieved, so that the likelihood of achieving a complete coverage of the item (the rim) with the curable fluid is increased.

The robot arm can, for instance, be a "cobot", which can be trained by a skilled professional in the art of applying spray paint.

The embodiment with the robot arm further comprises a controller 70, configured to position the coating unit in relation to the rim for applying the fluid onto the rim in accordance with a predetermined application pattern.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. An apparatus for painting of an item, wherein the item is a rotationally symmetric item, wherein the apparatus comprises:
   an openable paint booth with air inlet and air outlet and door for closing the paint booth during operation;
   a coating unit with one or more spray nozzles for applying a curable fluid onto the item;
   an item holder supplied with assembly bodies for disengageable securing of the item for rotation around an axis of rotation, coinciding with the item's center axis, during coating with the fluid;
   a suspension bracket wherein the item holder is mounted, and wherein the suspension bracket is configured to rotate the item holder around a pivot point, extending a direction perpendicular to the axis of rotation, coinciding with a diameter through the item and to angle the item while the item is being rotated;
   a curing unit; and
   a controller connected to the apparatus' different elements in order to control these during operation, wherein the suspension bracket and the one or more spray nozzles are arranged in way which is mutually displaceable.

2. The apparatus according to claim 1, wherein the assembly bodies comprise at least three and four rotating wheels for supporting the item at its circumference, wherein the item is a car rim.

3. The apparatus according to claim 2, wherein the rotational wheels are assembled in a displaced manner toward each other and away from each other, for adjustment in accordance with differing item sizes, so that the item's center is coinciding with the intersection of the pivot axis and the axis of rotation.

4. The apparatus according to claim 2, wherein at least one rotational wheel is connected to a motor for rotating the item when the apparatus is operating.

5. The apparatus according to claim 1, wherein the one or more spray nozzles and curing units are assembled on the same guide.

6. The apparatus according to claim 1, wherein the controller is configured to position the coating unit in relative to the item for applying the fluid onto the item in accordance with a predetermined coating pattern.

7. The apparatus according to claim 1, wherein the coating unit comprises a gripping device configured to hold and activate the one or more spray nozzles.

8. The apparatus according to claim 1, wherein the coating unit comprises a robot arm and the one or more spray nozzles for applying the curable fluid onto the item.

9. The apparatus according to claim 8, wherein the one or more spray nozzles and curing unit is assembled on the same robot arm.

10. The apparatus according to claim 1, wherein the curable fluid is Infrared curable, and the curing units comprise an Infrared source.

11. The apparatus according to claim 1, wherein the curable fluid is UV curable, and the curing units comprise one or more UV light sources.

12. The apparatus according to claim 1, wherein the entire apparatus is provided in one housing.

13. A method comprising:

providing an apparatus for painting of an item, wherein the item is a rotationally symmetric item, the apparatus having an openable paint booth with air inlet and air outlet and door for closing the paint booth during operation; a coating unit with one or more spray nozzles for applying a curable fluid onto the item; an item holder supplied with assembly bodies for disengageable securing of the item for rotation around an axis of rotation, coinciding with the item's center axis, during coating with the fluid; a suspension bracket in which the item holder can be mounted, wherein the suspension bracket is configured to rotate the item holder around a pivot point, extending a direction perpendicular to the axis of rotation, coinciding with a diameter through the item and to angle the item while the item is being rotated; a curing unit; and a controller; wherein the suspension bracket and the one or more spray nozzles are arranged in way which is mutually displaceable mounting the item in the assembly bodies on the item holder;

coating with the curable fluid using the coating unit;

rotating the item around the axis of rotation, coinciding with the item's center axis during coating with the curable fluid;

angling the item holder wherein the angling is performed around the pivot point extending in the direction perpendicularly to the axis of rotation, coinciding with the diameter through the item;

curing the fluid with the curing unit; and dismounting the item from the assembly bodies.

14. The method according to claim 13, wherein mounting of the item in the assembly bodies on the item holder further comprises, that the assembly bodies are displaced in a direction away from each other and/or toward each other, for accommodating different rim sizes, wherein the item is a car rim.

15. The method according to claim 13, wherein the coating unit further comprises a robot arm.

16. The method according to claim 15, wherein the method further comprises:

receiving input concerning the item's diameter and design of the item's surface, which is to be painted;

calculating a coating pattern for applying the fluid based on the item's diameter and design of the item's surface, to be painted;

calculating mutual movement pattern for the item and the coating unit to achieve the calculated coating pattern; and moving the item and the coating unit based on the calculated movement patterns.

17. The method according to claim 15, wherein the method is for painting of a rim and further comprises:

receiving input concerning the rim's size and number of spokes in the rim;

calculating a coating pattern for applying the fluid based on the number of spokes and rim size;

calculating mutual movement pattern for the rim and the coating unit to achieve the calculated coating pattern; and moving the rim and the coating unit based on the calculated movement patterns.

18. The method according to claim 13, wherein the method further comprises choosing a fluid among curable UV fluid and curable IR fluid.

* * * * *